Sept. 6, 1960 S. N. SMALL 2,951,492
CRANK DEVICE FOR RAISING AND LOWERING
GARDEN UMBRELLA CANOPIES
Filed Dec. 26, 1956 2 Sheets-Sheet 1
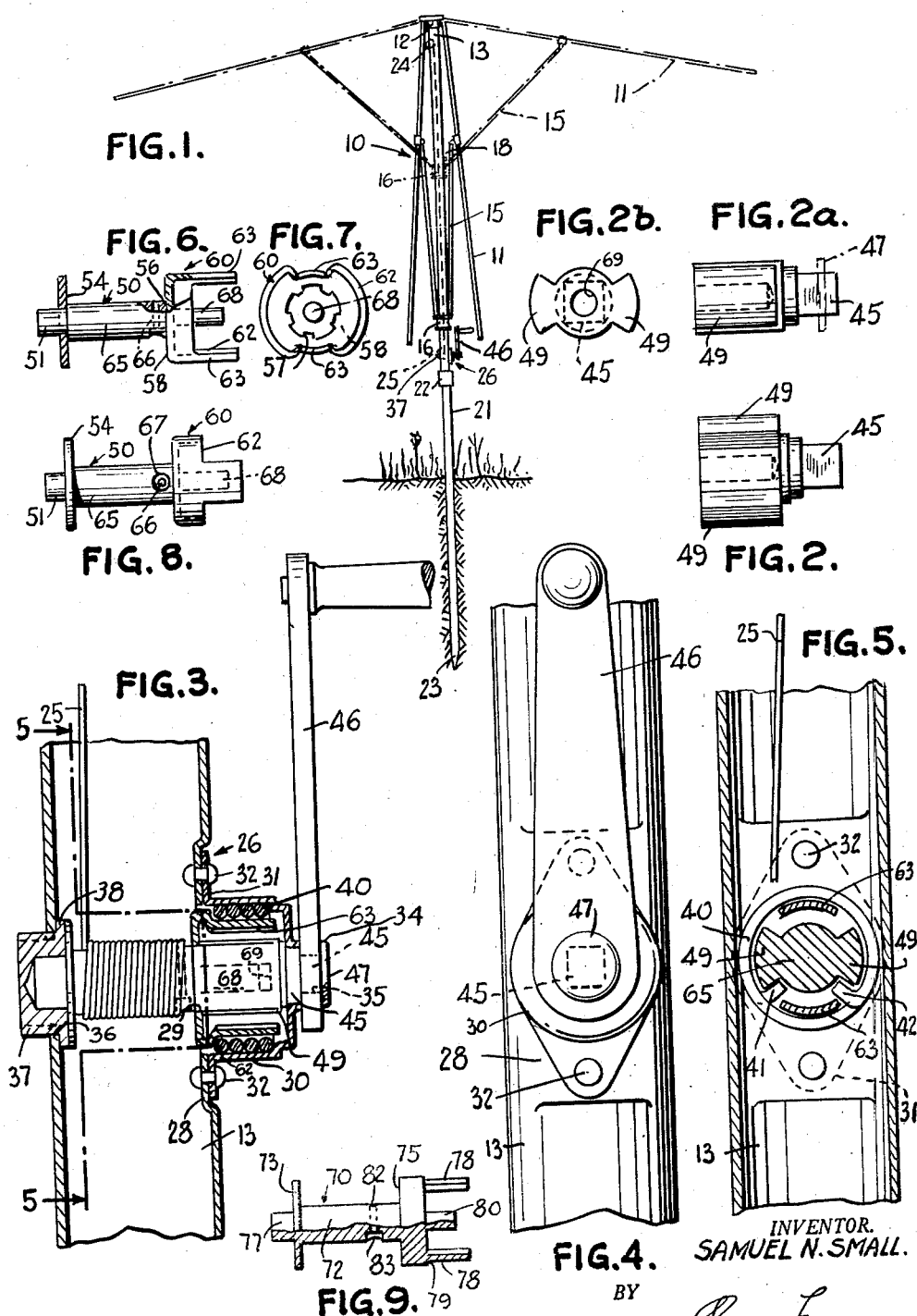
INVENTOR.
SAMUEL N. SMALL.
BY
Percy Freeman
ATTORNEY.

Sept. 6, 1960 S. N. SMALL 2,951,492
CRANK DEVICE FOR RAISING AND LOWERING
GARDEN UMBRELLA CANOPIES
Filed Dec. 26, 1956 2 Sheets-Sheet 2
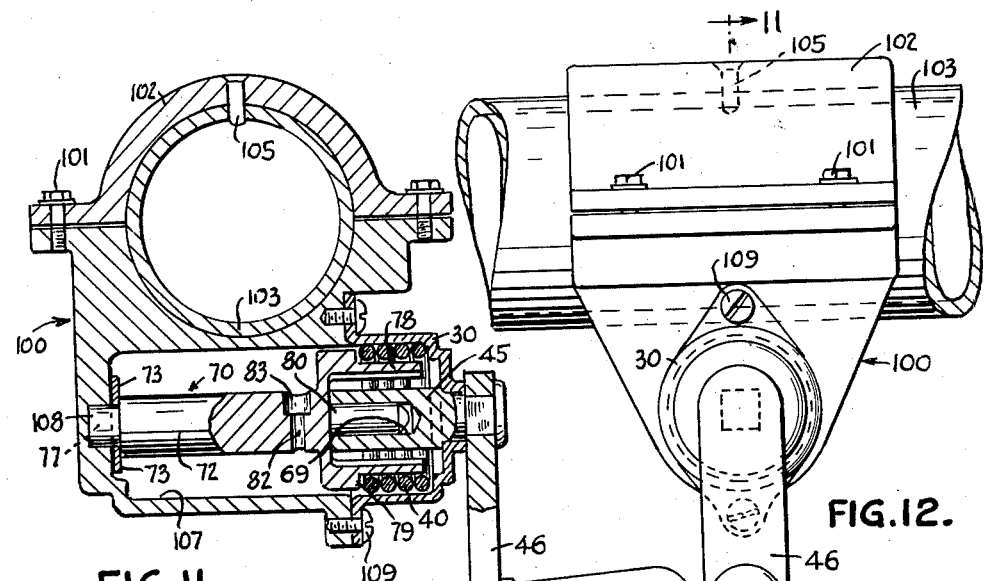
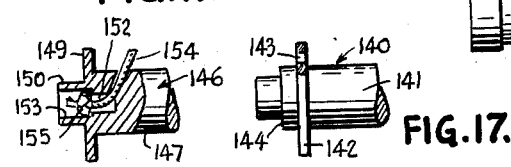
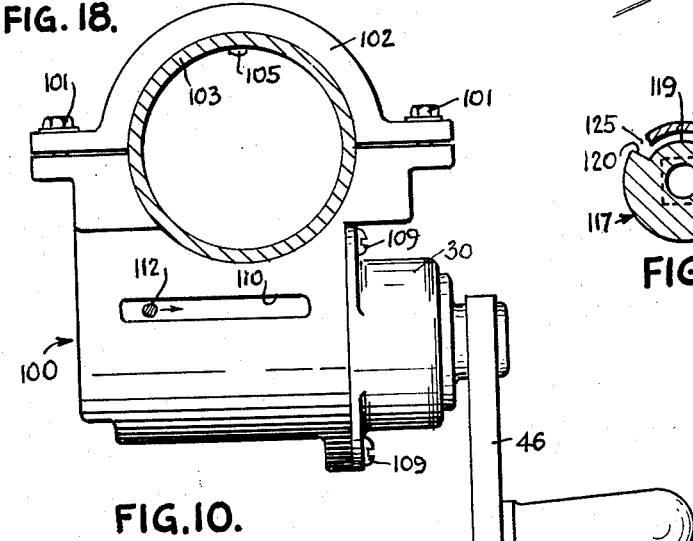
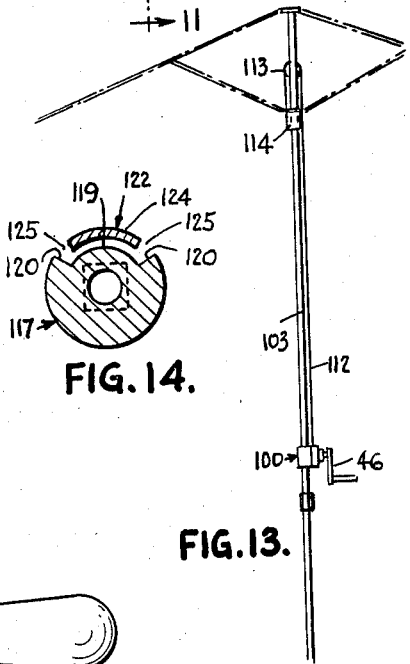
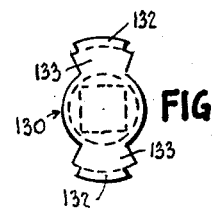
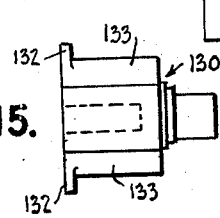
INVENTOR.
SAMUEL N. SMALL.
BY
ATTORNEY.

United States Patent Office 2,951,492
Patented Sept. 6, 1960

2,951,492
CRANK DEVICE FOR RAISING AND LOWERING GARDEN UMBRELLA CANOPIES

Samuel N. Small, Valley Stream, N.Y., assignor to Alfred G. Cohen and Paul Weiss, both of Flushing, N.Y.

Filed Dec. 26, 1956, Ser. No. 630,680

7 Claims. (Cl. 135—20)

This invention relates to garden umbrellas and, more particularly, to mechanical advantage devices for effecting the opening and closing of the umbrella canopy.

Various types of mechanical advantage operators have been proposed for use in garden umbrellas of the type having canopies that are movable between an open and a closed position. Aside from being difficult to use, certain of these devices have been found to be hazardous, particularly those using handles that are controlled by a ratchet and pawl device. In certain instances, the handle unwinds at a rapid speed after effecting disengagement of the pawl, thereby imparting injury to anybody's hand that may be within the path of movement of the handle. Accordingly, an object of this invention is to provide a self-locking mechanical advantage device for use in connection with garden umbrellas that is simple in construction, efficient in operation, and which will effectively overcome substantially all possible hazards.

Another object of this invention is to provide a self-locking, friction type, operating device for winding the cable of flexible cable-operated lawn umbrellas which may be readily installed within tubular umbrella support poles and which may be assembled therewith at a relatively low cost.

A still further object of this invention is to provide a novel friction brake assembly for mechanical advantage actuating devices for lawn umbrellas wherein a cable winding sheave may be readily rotated by the operating handle, but which is effectively locked, by friction, against rotation by any force exerted by the cable.

All of the foregoing and still further objects and advantages of the invention will become apparent from a study of the following specification, taken in connection with the accompanying drawing, wherein:

Fig. 1 is a front elevational view of an umbrella made in accordance with the present invention, showing the canopy in several operating positions, with the canopy cover removed.

Fig. 2 is a side view of one of the operating elements.

Fig. 2a is a top view of the element shown in Fig. 2.

Fig. 2b is an end view of the element shown in Fig. 2a.

Fig. 3 is a longitudinal sectional view of the apparatus showing the assembled operating elements.

Fig. 4 is a side elevational view of the device shown in Fig. 3.

Fig. 5 is a cross-sectional view taken along line 5—5 of Fig. 3.

Fig. 6 is a plan view, with parts broken away, showing one form of one of the elements of the operating device.

Fig. 7 is a side view of the element shown in Fig. 6.

Fig. 8 is a view similar to Fig. 6, showing the complete outline of the element.

Fig. 9 is a plan view, with parts broken away, of a modified form of operating element as shown in Figs. 6 to 8.

Fig. 10 is a top elevational view of a modified form of the present invention.

Fig. 11 is a cross-sectional view taken along line 11—11 of Fig. 12.

Fig. 12 is a side elevational view of the device shown in Fig. 10.

Fig. 13 is a view similar to Fig. 1, showing the device of Figs. 10 to 12 in operative association with an umbrella assembly.

Fig. 14 is a cross-sectional view of a modified form of motion-transmitting member and operating member assembly.

Fig. 15 is a view similar to Fig. 2b, showing a modified form of operating member.

Fig. 16 is a side elevational view of the member shown in Fig. 15.

Fig. 17 is a fragmentary side elevational view of a modified form of cable drum.

Fig. 18 is a view similar to Fig. 17, showing a still further modified form of cable drum assembly.

Referring now to Fig. 1 of the drawing, an umbrella made in accordance with the present invention is shown to have a collapsible canopy 10 supported for movement between an opened and closed position. The canopy framework includes a plurality of radially outwardly extending ribs 11 that are pivotally mounted at their upper extremities on the crown 12 that is supported at the top of the upper pole member 13. A stretcher bar or brace 15 is pivotally secured at one end to the mid-section of each rib 11 and at the other end to a vertically slidable runner 16. The canopy is opened by raising the runner 16 vertically into abutment with a fixed stop 18 at the upper portion of the pole, whereupon a retractable stop engages beneath the runner to hold it in a raised position. For convenience, the upper pole 13 is releasably connected to the lower pole 21 by means of a sliding joint 22. The entire umbrella may be provided with a pedestal or may have a point 23 at the lower end of the pole that may be driven into the turf or ground.

The umbrella canopy may be raised and lowered by means of a flexible cable 25 that is trained about various pulleys 24 and connected to a mechanical advantage device, generally indicated at 26. As is more clearly shown in Figs. 2 to 4, the upper pole 13 is provided with a flat bearing surface 28 having a centrally located opening 29, around which a hat-shaped housing 30 is secured, such as by screws or rivets 32. The outer end of the housing 30 is stepped to a reduced bearing area 34 having a centrally disposed opening 35, for purposes hereinafter described. The diametrically opposite side of the pole 13 is also provided with a non-circular opening 36 through which a similarly shaped bronze bushing 37 extends and is secured against rotational movement therein. The open end of the bushing is provided with a circumferential flange 38 that engages with the interior adjacent portions of the pole 13, so as to prevent the outward movement of the bushing from engagement therewith.

A convoluted torsion spring 40 is disposed within the housing 30 and has each end 41, 42, turned inwardly toward the center thereof, as more clearly shown in Fig. 5. A rotatable operating or driving member 45 has a reduced end of rectangular cross section extending outwardly through the opening 35 in the housing and into secured engagement with one end of an operating handle 46. A bolt or rivet 47 integrally connects the handle to the operating or driving member. The inside portion of the operating or driving member 45 has a pair of diametrically opposite stops 49 which extend radially toward the spring 40. Each stop 49 is disposed immediately adjacent to one of the ends 41, 42, of the spring, so that rotation of the operating or driving member 45 in either direction is operative to effect rotation of the spring 40 that is frictionally engaged with the interior surface of the housing 30. Because of the manner in which the spring is wound, the particular placement of the stops 49 relative to the ends thereof, is such that rotation of the operating member in either direction tends to tighten the convolutions of the spring, thereby reducing the frictional resistance thereof with the housing and permitting the rotation of the handle 46.

Referring now to Figs. 6 to 8, one form of driven member or drum 50 is shown that is adapted to be supported between the housing 30 and the bronze bushing 37. One end 51 of this drum is of reduced circular cross section and is rotatably received within the interior of the bushing 37. A washer 54 supported on the end 51 of the drum engages with the flange 38 of the bushing to facilitate relative rotation therebetween.

The opposite end of the drum or driven member is provided with a plurality of serrations 56 that are received within circumferentially spaced reentrant portions 57 that define an opening in the back wall 58 of a cylindrical rotation transmitting member 60. The side walls of this member 60 are provided with a pair of diametrically opposite cutouts that establish diametrically opposite flanges or fingers 63 which are spaced radially inwardly to define a pair of spring-retaining shoulders 62 that prevent the spring 40 from moving axially outwardly through the open end of the housing 30, as more clearly shown in Figs. 3 and 7. The back wall 58, together with the washer 54 and cylindrical surface of the drum 50, define a sheave 65 around which a flexible cable 25 may be wound. A transverse bore 66 and enlarged counter bore 67 provide means for fastening the end of the cable to the drum. The drum 50, at its serrated end, is provided with a substantially long positioning pin 68 that extends through the opening in the back wall 58 of the member 60 and is received within a similarly elongated axial bore 69 in the inner end of the operating or driving member 45 that provides a stable bearing surface for the pin.

As shown in Figs. 3 and 5, one of the flanges 63 of the rotation transmitting member 60 is disposed between the ends 41, 42, of the spring, the other flange 63 being disposed between the diametrically opposite stops 49 of the operating or driving member. It will thus be recognized, that rotation of the member 60 and hence the flanges or fingers 63 in either direction would engage the ends of the spring and tend to loosen the windings thereof, thereby increasing the frictionally resistance between the spring and the inside of the housing 30. Of course, the greater the force tending to rotate the drum, the greater the frictional resistance between the spring and housing tending to resist such rotation. Therefore, the operating assembly cannot be rotated by the action of the cable 25, but the drum 50 can only be rotated through the spring 40 that is driven in either direction by the operating or driving member 45 under the influence of the operating handle 46, as hereinbefore described.

In assembling the aforementioned apparatus, the cable is trained through the respective pulleys and downwardly through the hollow interior of the upper pole 13 into proximity with the mechanical advantage device 26 or the drum 50 thereof. With all of the parts removed, the bushing 37 is inserted through the opening 29 in the flat 28 at one side of the pole and into the opening 36. The drum 50, together with the washer 54, is then inserted into the open end of the bushing, whereupon the motion transmitting member 60 is engaged with the serrations 56 on the outer end of the drum and inserted into the interior of the spring and housing in the manner shown in Fig. 5. Of course, the operating member 45 is also positioned within the housing so that the diametrically opposed stops 49 assume their proper position. The housing is then secured to the flat 28 of the pole, whereupon the handle 46 may be attached to the outer end of the operating member 45 by means of the rivet or bolt 47. It will be recognized that this assembly requires a minimum number of parts, all of which may be made by simple die stamping or similar operations.

A modified form of motion transmitting member and drum is shown in Fig. 9, wherein the parts are integral and may be constructed in one piece. The drum 72 is bounded at one side by an integral washer 73 and at the other side by a fixed head 75, which define a sheave around which the flexible cable may be wound. The outer end of the member 70 is of reduced circular cross-section and the inner end of the head 75 is provided with a pair of integral diametrically opposite flanges or legs 78 which are spaced radially inwardly from the periphery of the head 75 to define a shoulder 79 that is effective to retain the spring 40 within the housing 30, as hereinbefore described. A positioning pin 80 extends between the legs 78 and is concentric with the longitudinal axis of the member. A transverse bore 82 and enlarged counter bore 83 provide similar means for fastening the end of the cable thereto. In assembling this device to the aforementioned structure, the bronze bushing 37 is first inserted in the unit, whereupon the entire motion transmitting member 70 may be positioned in the manner described. This arrangement has the advantage that a minimum number of parts and assembly operations are required.

Referring now to Figs. 10 to 13 of the drawing, an operating mechanism similar to that hereinbefore described is shown in the form of an enclosed unit 100 that is secured to the exterior of the support pole by means of bolts 101 and a U-shaped yoke 102. The entire unit is positioned at any desired point along the length of the pole by means of a positioning pin 105 that may extend through a similar locating bore in the pole 103. This unit includes a transversely extending housing 107 that has a bore 108 at one end thereof that rotatably supports the end 77 of the motion transmitting member 70. The opposite extremity of this housing 107 is closed by means of the hat-shaped housing 30 that is secured to the unit by means of any suitable fastening means, such as the screws 109. The upper side of the housing, as better shown in Fig. 10, is provided with a transversely extending slot 110 through which the operating flexible cable 112 extends into securing engagement with the drum 72 of the motion transmitting member. As is shown in Fig. 13, the cable 112 extends around a sheave 113 adjacent to the top of the pole 103 and is secured to a slidable runner 114 that is associated with the umbrella canopy. Thus, by rotation of the operating handle, in the manner hereinbefore described, the flexible cable 112 may be lengthened and shortened in order to operate the canopy. It will be noted, that in this embodiment, none of the operating parts or the flexible cable are confined within the interior of the pole 103, thereby facilitating inspection, repair, and replacement of parts.

Referring now to Fig. 14 of the drawing, a modified form of operating member and motion transmitting member assembly is shown wherein the operating member 117 is provided with a single circumferential cutout 119 that defines a pair of adjacent opposed stops 120. Similarly, the motion transmitting member 122 is provided with a single flange 124 that defines a pair of opposed abutments 125 at each side thereof. The purposes and functions of these parts are quite similar to those of the operating member 45 and the motion transmitting members 60, 70, hereinbefore described. In this embodiment, however, only a single stop member and flange is provided. Thus, these parts are assembled with the other operating parts so that the ends 41, 42, of the convoluted torsion spring are placed within the spaces defined between the opposed stops and abutments 120, 125, respectively. In this position, the stops and abutments are effective to control the operation of the device in the aforementioned manner.

If desired, a spring retaining shoulder 132 may be provided at the inner extremity of each of the stop members 133 of the modified form of operating member 130, as shown in Fig. 16. These shoulders 132 may be substituted, as described, to function in place of the similar spring-retaining shoulders 62, 79, provided on the two piece and one piece motion transmitting members 60, 70, respectively. Thus, the assembly of this modified form of motion transmitting assembly 130 with the other related parts is operative to prevent the torsion spring from being displaced outwardly relative to the hat-shaped housing 30.

Referring now to Fig. 17 of the drawing, a still further modified form of motion transmitting member 140 is shown wherein the drum 141 is provided with an integral flange 142 having a transversely extending bore 143 that is adapted to receive one end of the flexible operating cable. The flange 142 is spaced inwardly from the rotatable bearing shoulder 144 to prevent the engagement of the cable end with the adjacent supporting structure. In this connection, it is not necessary to provide a bore and counter bore through the drum, as hereinbefore described, to secure the end of the cable.

In Fig. 18, a still further modified form of rotation transmitting member 146 is shown wherein the drum 147 is provided with an integral flange 149 and an outwardly extending bearing portion 150. A bore 152 extends from the surface of the drum 147 into communication with a counter-bore 153 in the bearing extension 150. This bore and counter-bore is operative to receive the end of the flexible cable 154, in which the knot 155, formed at the end thereof, is securely maintained within the counter-bore 153.

Referring now to Figs. 1 and 13, it will be noted that the operation of all of the embodiments of this device is substantially the same. In raising or lowering the umbrella canopy, sufficient pressure is exerted upon the operating handle, in either direction, to overcome the initial frictional resistance between the spring and housing and the resistance exerted by the cable 25. Under no conditions can the opposite end of the cable effect rotation of the assembly since the parts are self-locking and the force tending to prevent rotation of the respective members increases with the force exerted through the cable tending to overcome that resistance. This mechanism can also be used with hinged types of umbrellas to control the angle of tilt between the jointed members. It will thus be recognized, that an extremely safe and efficient device has been provided that is self-locking at all times and which may be actuated with a minimum amount of effort.

Therefore, while this invention has been described with respect to the specific forms shown in the drawing, it is to be understood that such is not to be construed as imparting limitations upon the invention, which is best defined by the claims appended hereto.

Having thus described my invention, what I claim as new and desire to secure by Letters Patent, is:

1. A mechanical advantage operating device for effecting movement of an umbrella canopy between an open and a closed position comprising, in combination, a tubular pole, a flanged cylindrical housing affixed to the exterior of said pole, a convoluted torsion spring normally in frictional engagement with the interior side walls thereof, the ends of said spring extending radially of said spring and being circumferentially spaced apart, a rotatable drum, an operating element having oppositely projecting shoulders arranged within the spring and operatively engaging said spring ends in freeing the spring from said housing in rotation of the drum by the operating element in both directions, and said drum having a rotation-transmitting member with a portion freely disposed between adjacent surfaces of the spring ends and operatively engaging one of said spring ends in normally retaining the drum against rotation.

2. A mechanical advantage operating device as set forth in claim 1, wherein said rotation-transmitting member includes a cylinder having a finger at one extremity for engaging between the facing side of said spring ends and a transverse wall at the opposite extremity, said wall having reentrant portions defining a central opening, one end of said drum having serrations in locking engagement with said reentrant portions, and the opposite end of said drum having a bearing portion adapted to extend into rotatable association with said tubular pole.

3. A mechanical advantage operating device as set forth in claim 1, wherein said rotation-transmitting member is integrally formed at one end of said drum, and the other end of said drum comprises a rotatable bearing portion and inwardly spaced radially extending flange defining a sheave with said drum and said rotation-transmitting member.

4. In combination with a collapsible canopy having a support pole secured thereto, a mechanical advantage device for selectively moving said canopy between an open and a closed position, said device comprising a member operatively connected with said pole for rotation about an axis extending transversely of the longitudinal axis of said pole, a flexible element secured at one end to said member and the other end in operating relationship with said canopy, means for rotating said member, a self-locking coil spring brake enclosed within and having a direct braking engagement with a housing on said pole and actively operating between said housing and said member for locking said member against rotation by said flexible element, and said rotating means including brake freeing means arranged within said housing and operatively engaging said brake to free it from braking engagement with said housing for rotation by the means for rotating said member.

5. In a garden umbrella having a support pole and a collapsible canopy secured thereto for selective movement between an open and a closed position, mechanical advantage apparatus for effecting said movement of said canopy comprising, in combination, a rotatable drum supported upon said pole and extending transversely of the longitudinal axis thereof, a flexible cable secured at one end to said drum and operatively connected at the opposite end with said canopy, a crank arm for selectively rotating said drum in opposite direction to effect said movements of said canopy through said cable, a housing on said pole enclosing said drum, a self-locking coil spring connection arranged within and having a direct braking engagement with said housing and operative engagement with said drum, and means actuated by said crank arm for operatively engaging said connection to release the braking action of said connection on the housing for free rotation of said drum by said crank arm.

6. A garden umbrella as set forth in claim 5, wherein said self-locking connection comprises a convoluted torsion spring, said spring having ends extending radially inwardly, said drum including a rotation transmitting member extending between the facing sides of said spring ends, a crank arm actuated member having stops disposed adjacent two opposed sides of said spring ends, both of said members having limited relative rotational movement within the housing, whereby rotation of said crank arm is operative to effect engagement of one of said stops with an adjacent end of said spring to reduce frictional resistance between said spring and housing to permit free operation of the canopy, and rotation of said drum by said cable effecting engagement of said rotation transmitting member with an adjacent one of said spring ends to increase frictional resistance between said spring and housing to prevent movement of the canopy.

7. In an umbrella employing a canopy, a cable-winding drum for movement of the canopy into open and closed positions in the winding and unwinding of a cable on said drum, a mechanism controlling operation of the drum, said mechanism comprising a housing, a torsion spring within and having a braking engagement with said housing, said drum having a rotation transmitting member within and operatively engaging said spring, crank actuated means within and operatively engaging said spring and said member, actuation of the member by tension on said cable retaining the spring in positive braking engagement with said housing, and rotation of said crank actuated means in either direction releasing said spring from braking engagement with the housing to permit free rotation of the drum in movement of the canopy into open and closed positions.

References Cited in the file of this patent

UNITED STATES PATENTS

| | | |
|---|---|---|
| 365,481 | Lyman | June 28, 1887 |
| 889,961 | Percival | June 9, 1908 |
| 2,595,697 | Pereira | May 6, 1952 |
| 2,661,752 | Kampf et al. | Dec. 8, 1953 |
| 2,747,591 | Ogden | May 29, 1956 |